United States Patent [19]

Schlitz

[11] 4,084,374

[45] Apr. 18, 1978

[54] HYDRODYNAMIC COUPLING

[75] Inventor: Robert Schlitz, Tettnang, Germany

[73] Assignee: Zahnradfabrik Friedrichshafen AG, Friedrichshafen, Germany

[21] Appl. No.: 769,201

[22] Filed: Feb. 16, 1977

[30] Foreign Application Priority Data

Feb. 18, 1976 Germany .............................. 2606430

[51] Int. Cl.² ............................................. F16D 33/00
[52] U.S. Cl. .................... 60/330; 188/296; 416/223 A
[58] Field of Search ............................ 60/330; 188/296; 416/223 A

[56] References Cited

U.S. PATENT DOCUMENTS

| 2,126,751 | 8/1938 | De La Mater | 188/296 |
| 2,786,552 | 3/1957 | De La Mater et al. | 188/296 |

FOREIGN PATENT DOCUMENTS

| 721,564 | 11/1965 | Canada | 60/330 |
| 1,625,836 | 2/1970 | Germany. | |
| 2,239,562 | 2/1974 | Germany. | |

Primary Examiner—Edgar W. Geoghegan
Attorney, Agent, or Firm—Karl F. Ross

[57] ABSTRACT

The rotor and stator wheels of a hydrodynamic retarder, with confronting annular gorges together defining a toroidal channel of circular or slightly elliptical cross-section, have blades within their gorges which are of wedge-shaped cross-section and have slightly rounded edges that may or may not coincide with the radial direction. The blades have flat leading and trailing flanks, the former including an angle of about 45° - 55° with the plane of rotation so as to be inclined to the axial direction at an angle of about 35° to 45°; the vertex angle of the wedges lies between about 15° and 20°. Such a blade structure can be cast in a unitary mold from which it is extracted by a helicoidal twisting motion. A suitable radius of curvature for the edge rounding is in the range of about 1.5% to 4% of the channel diameter.

7 Claims, 8 Drawing Figures

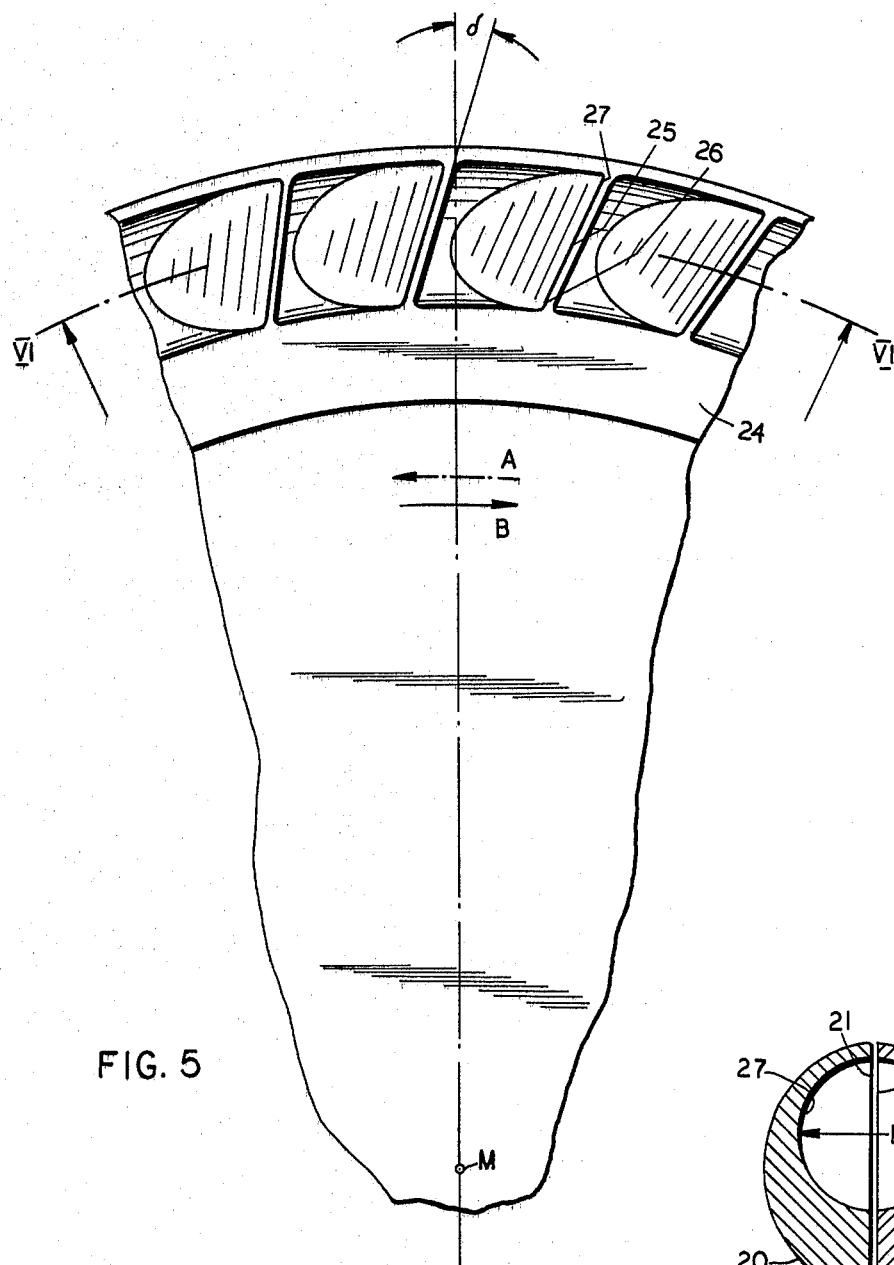
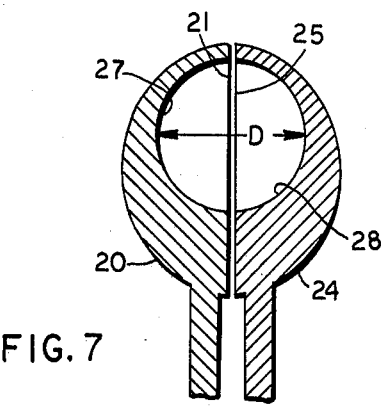
FIG. 6
FIG. 5
FIG. 7

HYDRODYNAMIC COUPLING

FIELD OF THE INVENTION

My present invention relates to a hydrodynamic coupling, such as a brake or retarder, in which two coaxial wheels are relatively rotatable and have confronting annular gorges together defining a toroidal channel of generally circular cross-section. The gorge of each wheel is subdivided into a multiplicity of pockets by a set of usually equispaced blades whose free edges lie close to the opposite wheel in a plane transverse to the axis of rotation.

BACKGROUND OF THE INVENTION

Various blade configurations have been proposed in such a coupling for the purpose of increasing its coupling factor (i.e. its braking effect in the case of a retarder) and/or for intensifying the flow of hydraulic liquid which conventionally can be used for cooling purposes; see for example U.S. Pat. No. 2,126,751. In some instances, the blade is provided with a facet at its free edge in order to sharpen the latter, e.g. as shown in German Pat. No. 1,625,836. Other wheel structures, exemplified by German published specification No. 2,239,562, have blades whose leading and trailing flanks gradually converge toward their free edges.

As long as the blades are substantially centered in radial planes, a wedge-shaped blade profile facilitates the casting of the entire blade assembly in a unitary mold. This, however, is difficult or impossible if the blades are tilted forwardly for increased efficiency, i.e. if the free edge of the blade is offset from its root in the direction of rotation relative to the other wheel. When a split mold is used, manufacturing costs are increased and the resulting burrs or ridges on the blade must be removed by separate machining so as not to interfere with the fluid flow. Naturally, any sharpening of the blade edges, as discussed above, also calls for a special machining operation.

OBJECT OF THE INVENTION

The object of my present invention, therefore, is to provide a high-efficiency blade structure for the wheels of a hydrodynamic coupling which can be cast in a one-piece mold and which does not require additional machining.

SUMMARY OF THE INVENTION

I have found, in accordance with my present invention, that the aforestated object can be realized by providing each forwardly tilted blade with planar leading and trailing flanks which converge at its free edge and include with each other a vertex angle of about 15° - 20°, the leading flank (i.e. the one located on the high-pressure side of the blade) including with the axial direction a mean angle in a range of about 35° - 40°. By "mean angle" is meant the angle in a plane parallel to the axis of rotation which bisects the blade midway along its radial height.

Such a blade assembly can be retracted from the mold by a helicoidal motion whose pitch is a function of the mean angle just referred to. This eliminates the need for dividing the mold into two or more parts (except, of course, for a cover plate which defines the rear surface of the wheel).

Such a blade structure is highly effective, both as to its coupling factor and as to its pumpng rate, without any edge sharpening. I prefer, however, to hold the radius of curvature of the rounded profile of the free blade edge, as it emerges from the mold, to a range between approximately 1.5% and 4% of the diameter of the toroidal flow channel. The casting of such a blade does not pose any particular problems.

BRIEF DESCRIPTION OF THE DRAWING

The above and other features of my invention will now be described in detail with reference to the accompanying drawing in which:

FIG. 5 is a view similar to FIGS. 1 and 3 but showing a stator wheel coacting with the rotor wheel of FIGS. 3 and 4;

FIG. 6 is a cross-sectional view taken on the line VI — VI of FIG. 5; and

FIG. 7 is a fragmentary cross-sectional view taken on the line VII — VII of FIG. 3 but showing also part of the stator wheel of FIGS. 5 and 6.

SPECIFIC DESCRIPTION OF THE DRAWING

Figure 2:
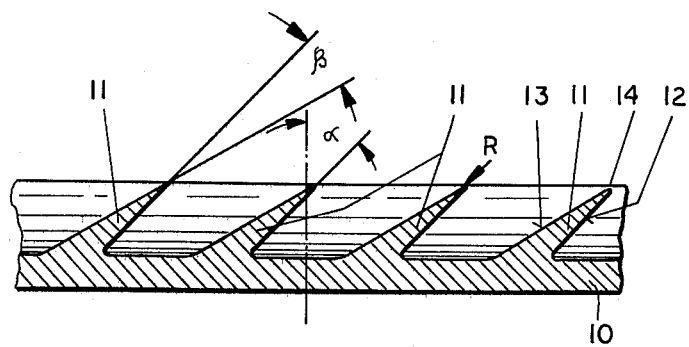
FIG. 2 is a cross-sectional view taken on the line II — II of FIG. 1.
Figure 1:
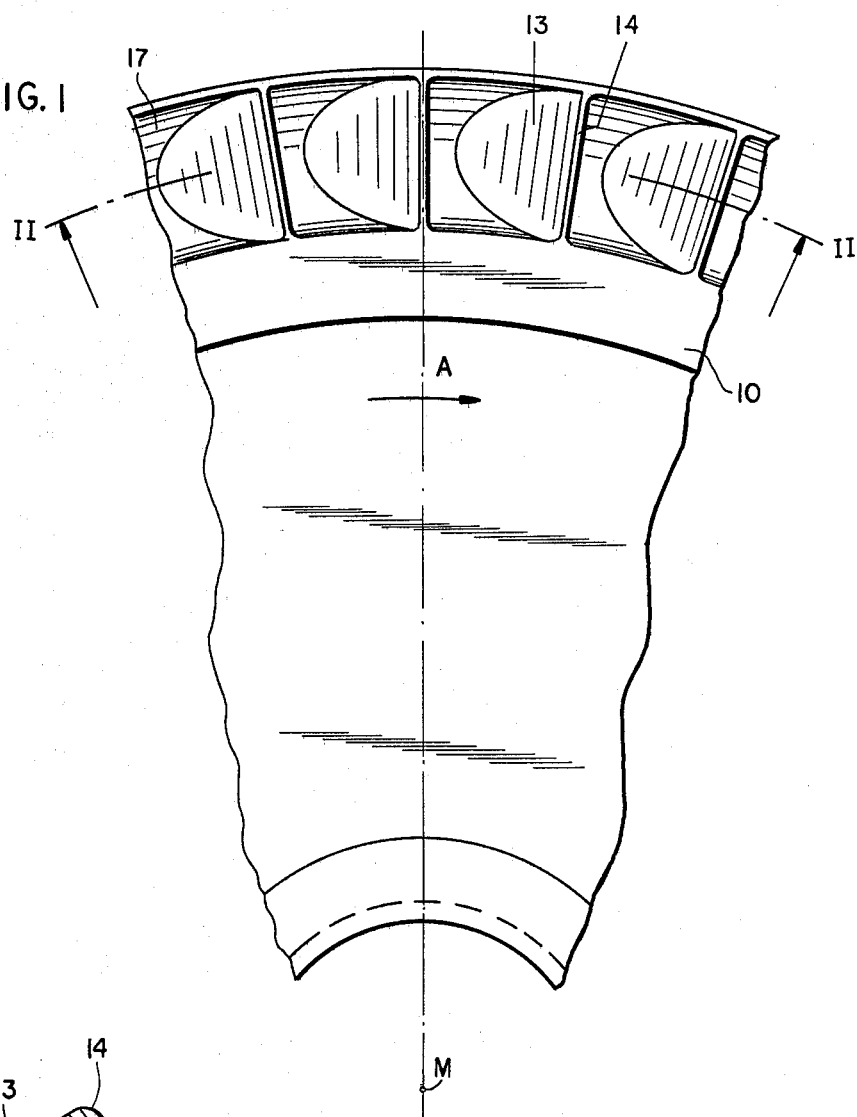
FIG. 1 is a face view of a representative portion of a rotor wheel of a hydrodynamic retarder according to my invention, having radially oriented blades.

In FIGS. 1 and 2 I have shown a rotor wheel 10 provided near its periphery with an annular gorge 17 which is subdivided into a multiplicity of pockets by a set of blades 11 that are forwardly inclined in the direction of rotation of the wheel about an axis M, that direction having been indicated by an arrow A. The blades are of wedge-shaped cross-sections having leading flanks 12 and trailing flanks 13 which converge at their free edge 14 with a vertex angle $\beta$ in the aforementioned range of about 15° - 20°. The leading flank 12 includes with the axial direction an angle $\alpha$ ranging between approximately 35° and 45°; that flank, accordingly, includes with a transverse plane a complementary angle equal to 90° - $\alpha$, or about 45° - 55°.

Figure 2A:
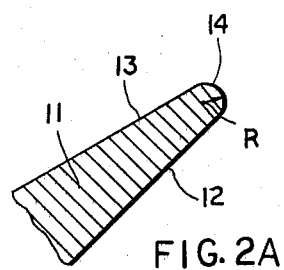
FIG. 2A is a cross-sectional view of a blade profile drawn to a scale larger than that of FIG. 2.

As shown more clearly in FIG. 2A, blade edge 14 has a rounded profile with a radius of curvature R advantageously measuring between substantially 1.5% and 4% of the diameter D (see FIG. 7) of the circular or slightly eliptical cross-section of the toroidal channel defined by the gorge 17 of rotor wheel 10 and by the complementary gorge of a juxtaposed stator wheel whose blade structure is preferably identical with that of wheel 10.

Thus, with a torus diameter D = 30 mm, a suitable radius R would be about 0.8 mm.

Whereas in the embodiments of FIGS. 1 and 2 the blade edges 14 extend in a radial direction with reference to wheel axis M, such radial extension is not essential for the purpose of my invention. Thus, I have illustrated in FIGS. 3 and 4 a modified rotor wheel 20 in which the blades and therefore the free edges 21 are inclined at an acute angle $\gamma$ with reference to the radial direction, that angle preferably ranging between about 10° and 30°. Such an inclination of the blades results in an increased pumping rate with only a slight reduction of the braking effect, compared with the radial arrangement of the preceding embodiment. Angle γ is so chosen that the radially innermost point 22 of edge 21 lies ahead of the radially outermost point 23 as seen in the direction of rotation (arrow A).

Figures 3, 4:
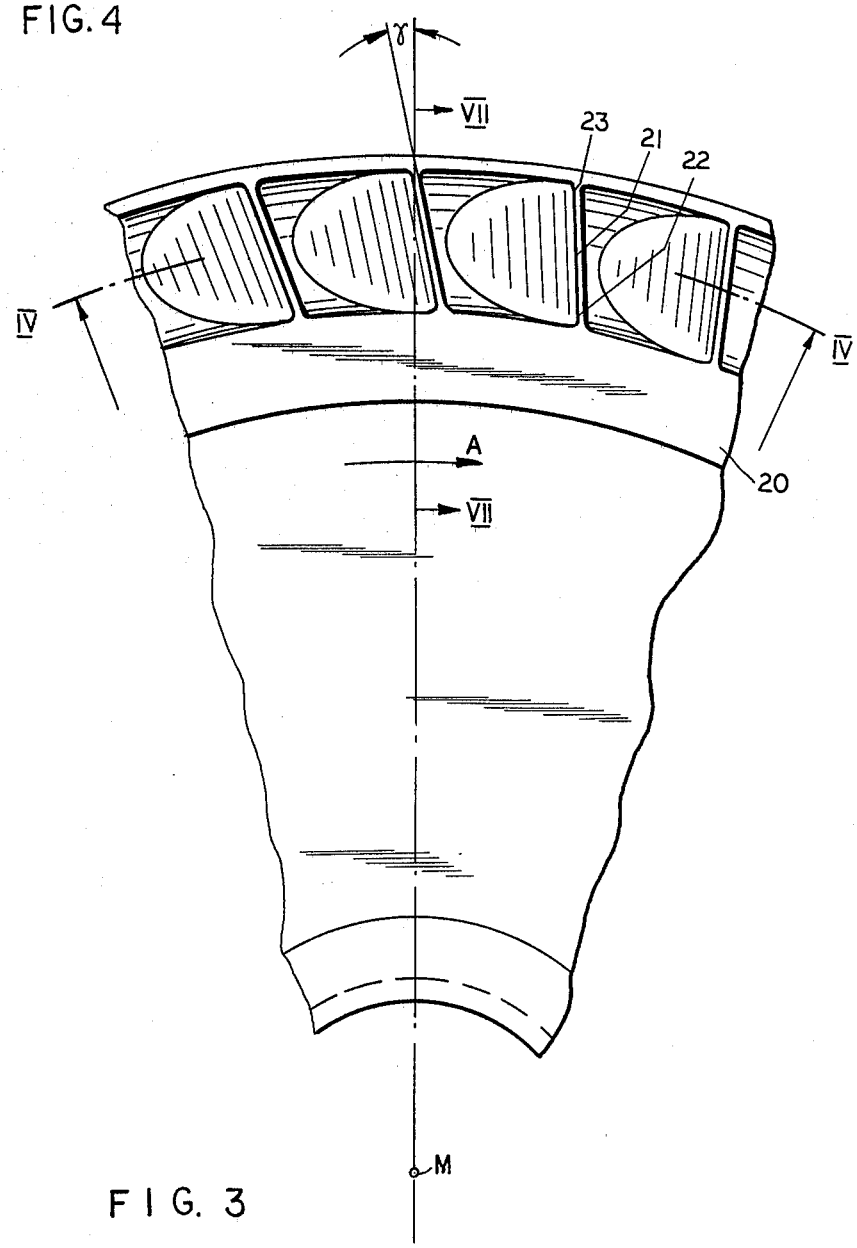
FIG. 3 is a view similar to that of FIG. 1 illustrating a modified rotor wheel according to my invention, with off-radial blades.
FIG. 4 is a cross-sectional view taken on the line IV — IV of FIG. 3.

Though the stator blades of a retarder having a rotor as shown in FIGS. 3 and 4 may have the radial orientation of the blades 11 shown in FIGS. 1 and 2, an increased braking effect with no significant reduction of pumping action can be achieved if the associated stator wheel has a blade structure substantially identical with that of the rotor wheel. Such a stator wheel has been illustrated at 24 in FIGS. 5 – 7, its free blade edges 25 being inclined to the radial direction at an angle δ which advantageously is equal to the angle γ of the rotor blades. The confronting gorges of wheels 20 and 24 have been designated 27 and 28 in FIG. 7.

In FIG. 5, arrow B indicates the sense of relative rotation of stator wheel 24, with the movement of the rotor wheel (arrow A) indicated in dot-dash lines. The outermost point 27 of blade edge 25 leads the innermost point 26 in the direction of relative rotation B, blade edges 21 and 25 being thus parallel to each other in a position of alignment.

I claim:

1. In a hydrodynamic coupling comprising two coaxial wheels with confronting annular gorges together defining a toroidal channel of generally circular cross-section, each wheel being provided in its annular gorge with a multiplicity of blades tilted forwardly in its direction of rotation relative to the other wheel, each blade having a leading flank and a trailing flank converging at a free edge proximal to the opposite wheel, said free edge lying in a plane transverse to the axis of rotation, the improvement wherein said leading and trailing flanks are planar and include with each other a vertex angle in a range of substantially 15° to 20°, said leading flank including with the axial direction a mean angle in a range of substantially 35° to 45°.

2. The improvement defined in claim 1 wherein said free edge has a rounded profile.

3. The improvement defined in claim 2 wherein said rounded profile has a radius of curvature ranging between substantially 1.5% and 4% of the diameter of said channel.

4. The improvement defined in claim 1 wherein said free edge of each blade of one of said wheels is inclined to the radial direction at an acute angle.

5. The improvement defined in claim 4 wherein the radially innermost point of said free edge lies ahead of the radially outermost point thereof in said direction of rotation.

6. The improvement defined in claim 4 wherein the free edges of the blades of both wheels have substantially the same angle of inclination with reference to the radial direction.

7. The improvement defined in claim 4 wherein said acute angle ranges between substantially 10° and 30°.

* * * * *